UNITED STATES PATENT OFFICE.

ROBERT GOTTWALD, OF GOLDBERG, GERMANY, ASSIGNOR TO ADOLF HEIM, OF RING, BRIEG, SILESIA, GERMANY.

PROCESS FOR CHAMOISING FUR SKINS.

No. 804,718. Specification of Letters Patent. Patented Nov. 14, 1905.

Application filed June 30, 1903. Serial No. 163,787.

*To all whom it may concern:*

Be it known that I, ROBERT GOTTWALD, a subject of the King of Prussia, German Emperor, residing at 463 Bahnhofweg, Goldberg, Silesia, in the Kingdom of Prussia and Empire of Germany, have invented a new and useful Improved Process for Preparing Fur Skins, of which the following is a specification.

My said invention relates to a process of preparing washable fur skins.

In proceeding according to my invention I take skins which have been cleaned and freed from dirt and softened in a suitable manner, as by soaking in water, and treat them with alum. For this purpose I may use an alum-bath in which for one hundred lamb-skins the following quantities and proportions would be observed—to wit, ten kilograms of alum dissolved in from sixty to seventy liters of boiling water, to which two hundred liters of water are subsequently added. After treatment by this alum solution they are soaked in a sour-bran preparation mixed with copper sulfate. This sour-bran preparation may be conveniently prepared by placing eight kilograms of wheat-bran in about ten liters of water and allowing the same to stand tightly covered for a day preceding its use and until it is sufficiently sour. For the one hundred lamb-skins referred to I employ one kilogram of copper sulfate in one hundred liters of water, and into this solution I introduce and thoroughly distribute the sour bran. The mixture is then poured over the skins, which are placed in a suitable receptacle and thoroughly worked therein for some minutes, whereafter they are removed and wrung out. The skins thus treated are finally subjected to the well-known chamois-tanning.

What I claim as my invention, and desire to secure by Letters Patent, is—

A process of preparing washable fur skins, consisting in treating the skins with alum, soaking them in a sour-bran preparation mixed with copper sulfate, and finally subjecting them to chamois-tanning, substantially as herein set forth.

In testimony whereof I have signed my name to this specification in the presence of two subscribing witnesses.

ROBERT GOTTWALD.

Witnesses:
ERNST KATZ,
ALBERT SCHEULS.